Figure 1:
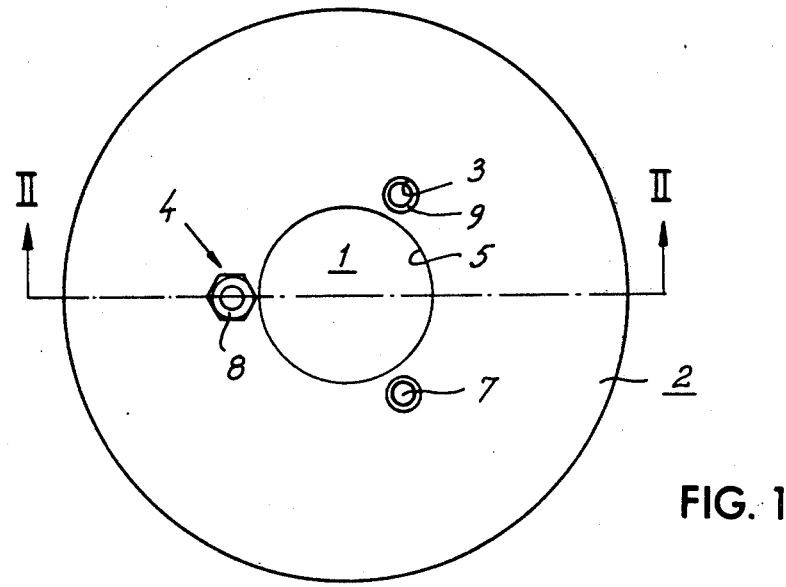

United States Patent [19]

Persson

[11] 4,183,688

[45] Jan. 15, 1980

[54] EXPANSIBLE SLEEVE DEFORMS HUB BORE AGAINST SHAFT

[75] Inventor: Inge B. Persson, Malmö, Sweden

[73] Assignee: Forenade Fabriksverken, Eskilstuna, Sweden

[21] Appl. No.: 825,785

[22] Filed: Aug. 18, 1977

[51] Int. Cl.² .................. F16D 3/80; F16L 17/00
[52] U.S. Cl. .................. 403/31; 29/526 R; 403/297; 403/15; 64/30 E
[58] Field of Search .......... 403/5, 15, 31, 110, 403/297, 370, 372; 192/76 R, 88 B, 85 AT; 64/30 C, 30 E; 29/522, 526

[56] References Cited

U.S. PATENT DOCUMENTS

| 2,214,177 | 9/1940 | Raybould | 403/297 |
|---|---|---|---|
| 2,390,168 | 12/1945 | Piot | 192/76 UX |
| 2,705,643 | 4/1955 | Green | 403/372 X |
| 3,447,652 | 6/1969 | Tipton | 192/85 AT |
| 3,572,511 | 3/1971* | Triplett | 403/372 X |
| 3,664,258 | 5/1972 | Veechi | 403/297 X |
| 3,776,651 | 12/1973 | Peter et al. | 403/370 X |
| 3,861,815 | 1/1975 | Landaeus | 192/88 B X |

FOREIGN PATENT DOCUMENTS

1442702 7/1976 United Kingdom ............ 403/297

*Primary Examiner*—Wayne L. Shedd
*Attorney, Agent, or Firm*—James C. Wray

[57] ABSTRACT

A coupling device for releasably coupling machine parts or other like structures. The coupling device comprises a pressure sleeve of a deformable material provided in one or more bores in one of the machine parts or an intermediate spacer body with the pressure sleeve having an associated screw clamp means. The coupling device provides coupling of the machine parts or other structures by use of a coupling device which is non-concentric with the machine parts or other structures.

12 Claims, 11 Drawing Figures

EXPANSIBLE SLEEVE DEFORMS HUB BORE AGAINST SHAFT

The present invention relates to a method for connecting machine parts or structures in which an outer machine part encloses one or more inner machine parts. The invention also relates to a coupling device for executing the said method.

The invention is useful both for connecting rotatable parts like a shaft and a hub and for axial connection of an outer machine part in relation to one or more inner machine parts.

For the connection of two rotatable machine parts it is conventional to use a key joint, a press joint and a shrinkage fit or a similar connection means. For a key joint a working is necessary both of the shaft and of the hub and an axial securing of the two machine parts is also necessary. Therefore key joints are relatively expensive. In addition a key joint gives a stiff joint which in case of overload can cause a rupture or breaking of some part of the joint. A press joint or a shrinkage fit in turn necessitates narrow tolerances and great accuracy in manufacture and mounting, and the said previously known methods for connecting machine parts therefore are relatively expensive.

As an alternative of such previously known joints separate coupling means have entered the market which means are intended to be mounted between two machine parts, for instance a shaft and a hub to provide a connection of the said machine parts when being tightened. Such separate coupling means are generally formed as a cylindric double walled sleeve into which wedges can be pressed by means of screws so that the walls of the sleeve walls are brought to expand in the radial direction. The coupling means also can be formed as a sleeve closed at one end and containing a plastic or elastic pressure medium which can be put under pressure so as to be brought to expand to the radial direction whereby the pressure medium brings the sleeve to change form by radial expansion.

Especially the latter type of such separate coupling means are very effective and can give a connection of the machine parts for any intended torque depending on the pressure force on the plastic or elastic pressure medium, and the machine parts can easily be separated by releasing the pressure of the pressure medium in the coupling sleeve and by removing the coupling means.

The said latter coupling means however requires a predetermined space between the machine parts to be connected and in the case that a shaft and a hub are already provided having a slip fit or similar in relation to each other the said previously coupling means can consequently not be used without working the shaft or the hub.

Further the known coupling means are not suitable in cases where there is a relatively large space between the shaft and the hub since the previously known coupling means cannot be made with particularly large wall thickness or having a large volume of the plastic or elastic pressure medium.

In some cases also the previously known coupling means give an unnecessary high precision or high connection force between the machine parts to be connected.

The present invention therefore intends to avoid the disadvantages in the previously known coupling means and to provide a method and a coupling device for connecting machine parts in which case an outer machine part encloses one or more inner machine parts which method can be utilized both for connecting rotatable parts and for axial or longitudinal locking of machine parts, and which method can be utilized in all kinds of available machine parts without the need of any special space between for instance the shaft and the hub and without the need of special working of the shaft or hub.

In the following the invention will be described more in detail with reference to the accompanying drawings. It is however to be understood that the devices shown in the drawings are only illustrating examples and that the invention can be modified in any way within the scope of the appended claims.

Figure 2:
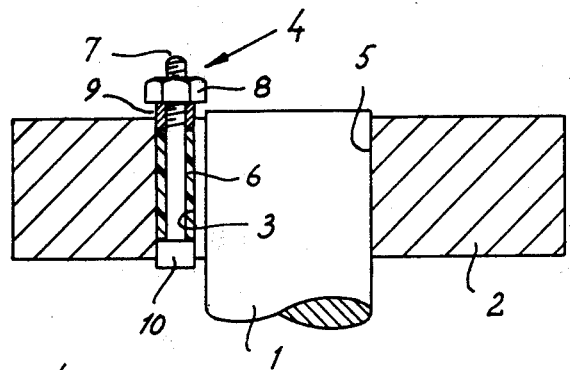
Figure 7:
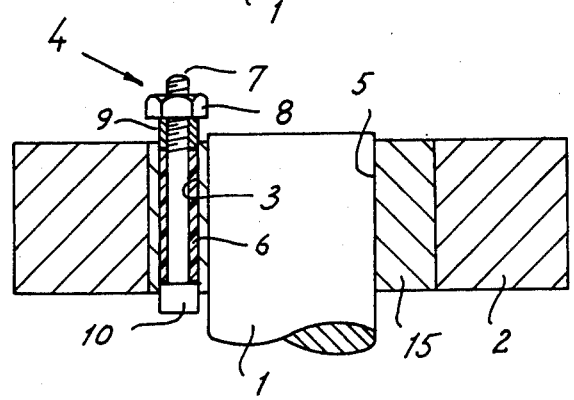
Figure 9:
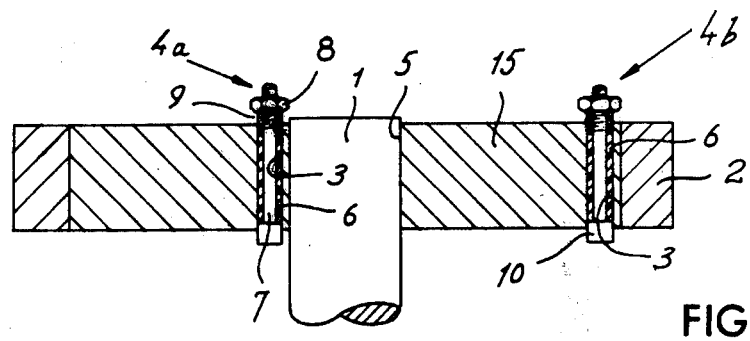
Figure 8:
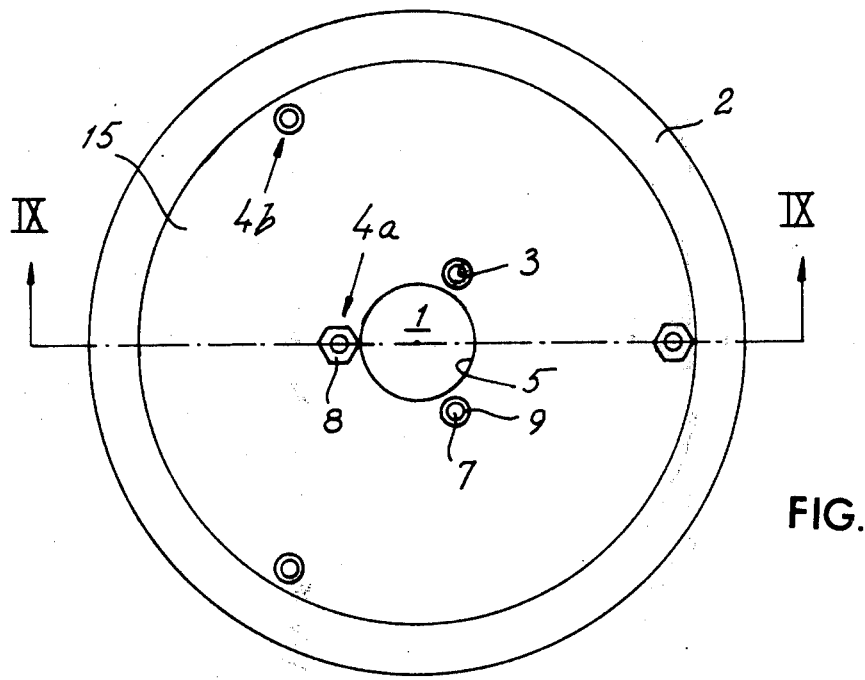
Figure 10:
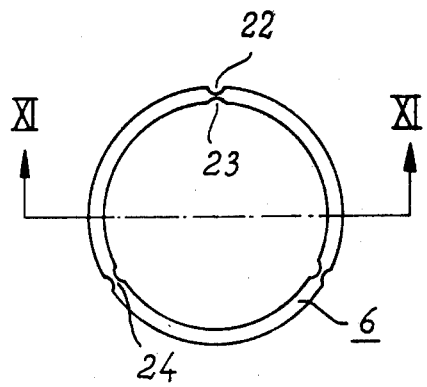
Figure 11:
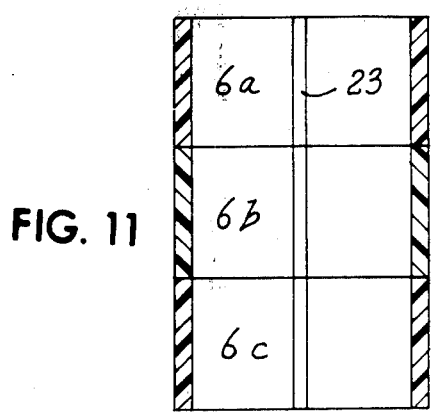

In the drawings:

FIG. 1 shows an end view of a shaft and a hub which are connected in accordance with the invention, FIG. 2 is a cross-section along the line II—II of FIG. 1, FIGS. 3, 4, 5 and 6 illustrate four alternative embodiments of a coupling device according to the invention, FIG. 7 shows in the same way as in FIG. 2 an axial cross-section through a shaft and a hub which are connected by means of a spacer sleeve, FIG. 8 is an end view of a further modified embodiment of the invention in which a shaft and a hub are connected, FIG. 9 is a cross-section along line IX—IX of FIG. 8, FIG. 10 shows an end view of a press sleeve for use in connection to the invention, and FIG. 11 finally shows an axial cross-section along line XI—XI of FIG. 10.

In the drawings same parts have been given the same reference number.

In FIGS. 1 and 2 is illustrated how a shaft 1 and a hub 2 are connected in accordance with the method of the invention. The shaft and the hub are formed with slip fit in relation to each other, so that the hub can be slipped on the shaft. To provide a locking of the parts in relation to each other a number of bores 3 are made through the hub and in the said bores coupling devices or coupling bodies 4 are mounted which when being tightened causes some parts of the hub to change form so that the said parts are pressed to the shaft and provides a connection of the shaft and hub.

The bores 3 are preferably provided evenly distributed around the shaft and the number of bores and the diameters thereof are chosen according to the circumstances. The bores 3 are made close to the shaft bore 5 of the hub 2, however at such distance therefrom that the coupling body 4 can be actuated by means of a tool.

The coupling body 4 generally comprises a press sleeve 6 and a clamp means 7. In FIGS. 1 and 2 the clamp means 7 is shown as a clamp screw having at one end a nut and at the opposite end a head with an inner hexagon hole. The said clamp means is shown in an enlarged scale in FIG. 5. Between the press sleeve 6 and the nut 8 a sleeve-like press piston 9 is mounted which provides a sealing between the screw 7 and the periphery of the bore 3.

The press sleeve 6 is made of a substantially incompressible material which is relatively soft so that the sleeve changes form when the nut 8 is tightened on the screw 7 and so that the axial force of the clamp means is transformed to a radial force exerted by the press sleeve 6. In the figures is indicated that the press sleeve 6 is made of a plastic material, but this indication is only for simplifying purpose and it is to be understood that the press sleeve can be made of any suitable material which is little incompressible and which is softer than the material of the clamp means 7 and the press piston 9. As examples of suitable materials for the press piston can be mentioned reinforced and non-reinforced plastic materials, lead or tin alloys, elastometers having a metallic filler material etc.

The press sleeve 6 and the screw 7 have such dimensions that they can be easily pushed into the bores 3 of the hub 2 and in the example illustrated in connection to FIGS. 1 and 2 the screw head 10 and the press piston 9 provide axial limits for the press sleeve 6. When tightening the nut 8 the press sleeve 6 is compressed in the axial direction, and the said axial force is by the material of the press sleeve transformed to radially directed forces which cause a deforming of the hub at the weakest portion thereof, i.e. at the portion thereof which is located closest to the shaft 1. When tightening the nuts of the different coupling bodies some parts of the hub are pressed to the shaft 1 and provide a connection between the shaft and the hub both in the axial direction and for torque transmitting. Depending on how strong connection is wanted a different number of coupling bodies can be mounted and the coupling bodies can be tightened differently strong. In some case it can be considered sufficient to have one single coupling body but in many cases, and especially when a good centering is wanted two or more coupling bodies ought to be provided evenly distributed around the shaft and on the same distance from the shaft bore 5 of the hub.

In order to disconnect the parts from each other the nuts of the coupling bodies are released, whereby the press sleeve 6 and the deformed part or parts of the hub regain their initial form so that the hub and the shaft are thereby immediately disconnected from each other.

Figure 3:
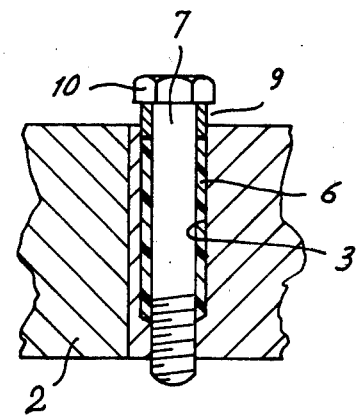

In FIGS. 3 through 6 some different alternative applications of the coupling bodies are illustrated. It is obvious that the invention can be utilized for connection of two parts so as to not to slip in relation to each other irrespectively of the type and form of such parts. In connection to FIGS. 1 and 2 is described a connection of a shaft and a hub, but a connection can likewise be made of two non-rotating machine parts, whereby the connection is provided against slip only in one direction. The coupling bodies illustrated in FIGS. 3–6 can be used irrespectively of what type of connection is intended. In FIG. 3 one of the parts to be connected is formed with a through bore which is threaded some distance at one end. From the thread to the opposite surface of the machine part the bore is widened to be able to enclose a press sleeve 6 and the said sleeve can be tightened by means of a screw 7 which between the head 10 thereof and the press sleeve 6 carries a press piston 9 of a material which is harder than the material of the press sleeve 6.

Figure 4:
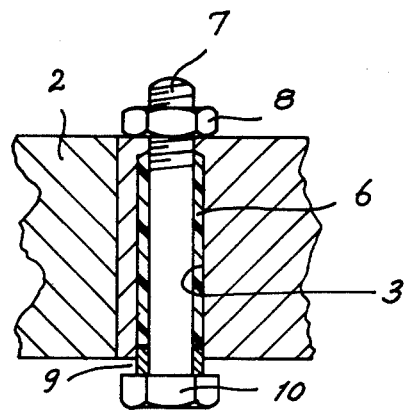

In FIG. 4 an alternative embodiment is shown, in which the through bore 3 is likewise widened from a point adjacent one surface of the connection means but in which the tightening of the press sleeve is made by co-action of the screw head 10 and the press piston 9 at one end and a nut 8 at the opposite end of the screw.

Figure 5:
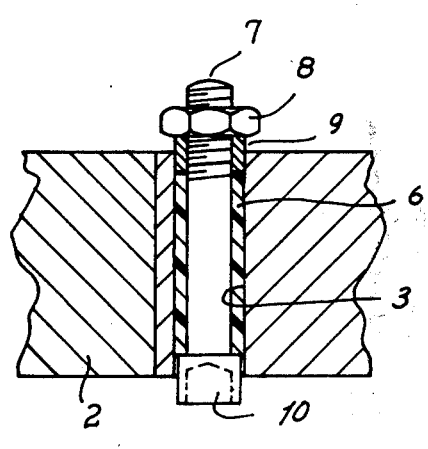

FIG. 5 shows the coupling body described in connection to FIGS. 1 and 2, however in an enlarged scale.

Figure 6:
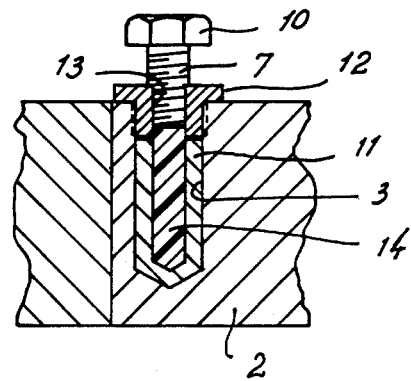

In FIG. 6 is illustrated a device, in which one of the parts to be connected is formed with a bore 3 extending into the said part to be connected but not through same. In the bore a sleeve-formed body 11 is introduced which is kept secured by means of a screw 12 having a through bore 13. In the inner cavity of the sleeve-formed body and some distance up into the through bore of the screw 12 a press body 14 is introduced which can be pressed by the end of a screw 7 which is threaded into the bore screw 12. By suitably choosing the material of the sleeve formed body 11 and the press body 14 a good co-action can be obtained between the two materials, so that a good pressure distribution and a correspondingly even deformation of the machine part 2 is obtained.

In the embodiments according to FIGS. 3, 4 and 6 the press sleeve and the press body respectively are only pressure actuated from one direction whereas the press body 6 in the embodiment according to FIG. 5 is pressure actuated from both ends, what gives a more evenly distributed pressure in the press sleeve.

In the case that either of or both parts to be connected are made of a forged material or an otherwise hard material it may cause difficulties to provide bores for the coupling body in the said part or parts and in such case the connection can be made as illustrated in FIG. 7. In this figure is likewise illustrated a connection of a shaft 1 and a hub 2, but the shaft bore of the hub is substantially wider than the diameter of the shaft, and in the space between the shaft and the hub a sleeve-formed spacer body 15 is provided. The spacer body can be made of a substantially more easily worked material than the material of the shaft and hub, and the spacer body therefore easily can be formed with bores 3 for the coupling bodies 4. In the illustrated case the coupling body is provided centrally in the material of the spacer body 15, and when compressing the press sleeve 6 by means of the screw 7 and the nut 8 the spacer body 15 is deformed both radially inwards to the shaft 1 and radially outwards to the hub 2.

A further embodiment of the type of the invention is shown in FIGS. 8 and 9, but in the latter case the space between the shaft 1 and the hub 2 is so large that a cylindric disc 15 is mounted in said space, which disc is connected to the shaft 1 by means of three coupling bodies 4a and to the hub by means of three coupling bodies 4b.

As mentioned above the press sleeve 6 is compressed when tightening the clamp means 7, 8. The said compression follows uniformly in the entire press sleeve and this means that both a radial and a peripheral expansion is obtained. If the press sleeve is made of a material which gives a plastic change of form, for instance a press sleeve of aluminium or some metal alloy, this plastic change of form can lead to the effect that the press sleeve does not regain its initial form when the nut of the screw is released what in turn can cause difficulties in dismounting the connection. It can also happen when tightening the nut or the screw that the press sleeve 6 tends to rotate together with the nut or the screw and this may likewise cause a plastic change or form of the press sleeve. To eliminate the said disadvantages one or more axial grooves can be provided in the press sleeve whereby portions of reduced thickness are formed which portions can take any plastic changes of form so as to compensate the peripheral expansion of sleeve and which portions prevent rotation of the sleeve together with the screw or the nut. In FIG. 10 is illustrated how the press sleeve 6 can be formed with three pairs of such axial grooves, viz. three grooves 22 in the outer periphery and three grooves 23 in the inner periphery. The grooves 22 and 23 are located in pairs just opposite each other and a portion 24 of reduced thickness is obtained between the said pairs of grooves. The number of axial grooves can be adapted according to the circumstances and in the most simple case only one axial groove is provided at the outer periphery of the sleeve.

In some cases it can be advantageous to divide the press sleeve into several short sleeve pieces, and in FIG. 11 is shown a press sleeve formed by three short sleeve pieces 6a, 6b and 6c which can be allowed to rotate in relation to each other and in which the grooves 22 and 23 of the three pieces can be distributed over a wider range of the periphery of the shaft.

In the above specification the press sleeve is described as being a separate unit. It is however obvious that the press sleeve may be provided fixed mounted on the clamp means 7 or formed as an integral part thereof.

It is obvious to the expert in the field how the method and the coupling body according to the invention can be modified and adapted to different need within the scope of the appended claims.

What we claim is:

1. A coupling device for connecting adjacent machine parts and like structures, wherein an inner machine part is enclosed within at least one outer machine part; said coupling device comprising at least one bore hole extending partially or completely through one of said machine parts and a pressure sleeve of deformable material disposed within said bore hole; said bore hole disposed adjacent to the interface between and non-concentric with said inner and outer machine parts; said pressure sleeve contacted by screw means which provides axial compression and radial deformation to said pressure sleeve, whereby said radial deformation of said pressure sleeve causes a corresponding radial deformation of a portion of one of said machine parts at said interface of said adjacent machine part.

2. The coupling device of claim 1, wherein said pressure sleeve is a hollow cylindrical member having clamp screw means extending axially therethrough; said clamp screw means adapted to act upon a hollow cylindrical pressure piston which acts upon said pressure sleeve.

3. The coupling device of claim 2, wherein said clamp screw means is threaded into one of said machine parts.

4. The coupling device of claim 2, wherein the clamp screw means is a bolt, the head of which contacts one end of said pressure sleeve and the shank portion of which contacts and is threaded into a nut which contacts the opposite end of said pressure sleeve.

5. The device of claim 1 wherein said coupling device comprises a spacer body disposed between said machine parts; said spacer body formed with one or more bores adjacent said inner machine part and one or more bores adjacent said outer machine part; said bores disposed adjacent the respective interfaces of said spacer body and said inner and outer machine parts.

6. The device of claim 5 wherein said spacer body comprises two or more bores with respective pressure sleeves, each bore having a separate clamp screw means.

7. The coupling device of claim 5, wherein said spacer body is an annular radial member which is a hollow cylindrical disc; said disc having a central bore; said central bore having at least one pressure sleeve with respective said screw means adjacent said central bore; and said disc comprising at least one pressure sleeve with respective screw means at its outer annular periphery.

8. The coupling device of claim 1, wherein said pressure sleeve comprises cylindrical and concentric inner and outer members of different materials; said inner member and outer sleeve body having a clamp screw means adapted to tighten onto the inner member.

9. The coupling device of claim 1, wherein said pressure sleeve is formed with at least one axial groove; said axial groove providing a reduced thickness in the pressure sleeve whereby spaces are formed between said adjacent machine parts; said spaces providing means for compensating for peripheral expansion of said pressure sleeve when said pressure sleeve is compressed.

10. The coupling device of claim 1 wherein said pressure sleeve comprises at least two shorter pressure sleeves mounted on the same clamp screw means.

11. The coupling device of claim 1 comprising at least two or more bore holes evenly distributed around said machine part.

12. The coupling device of claim 1 wherein said bore hole is disposed adjacent said interface at a point providing a thin walled portion to be deformed.

* * * * *